Doolittle & Crowder.
Cotton-Cultivator & Chopper.
N° 74519. Patented Feb. 18, 1868.
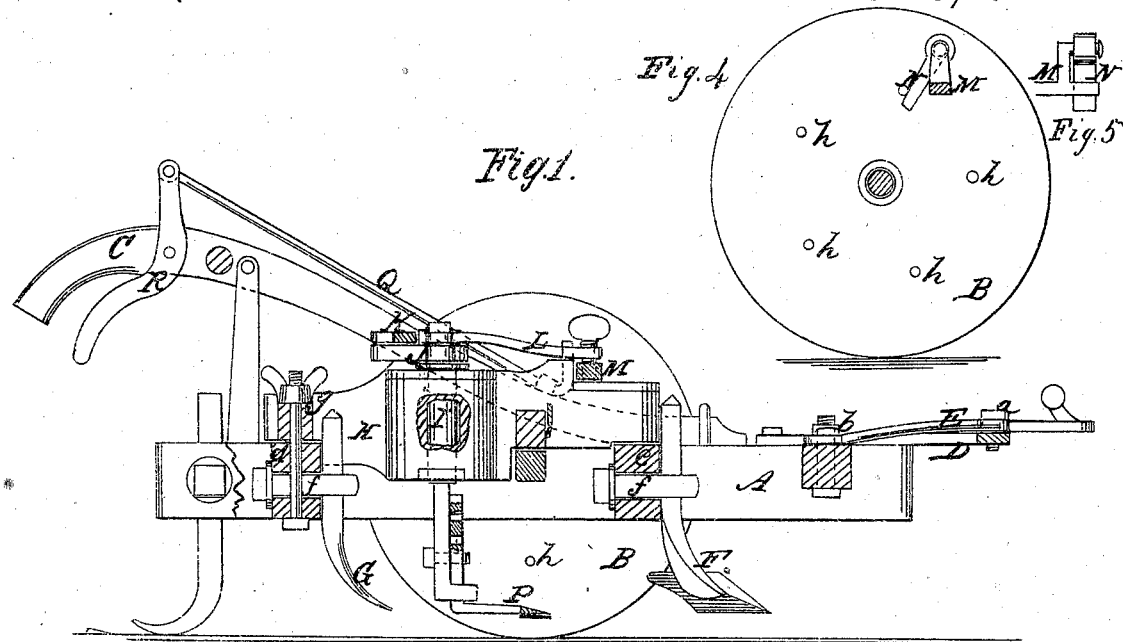
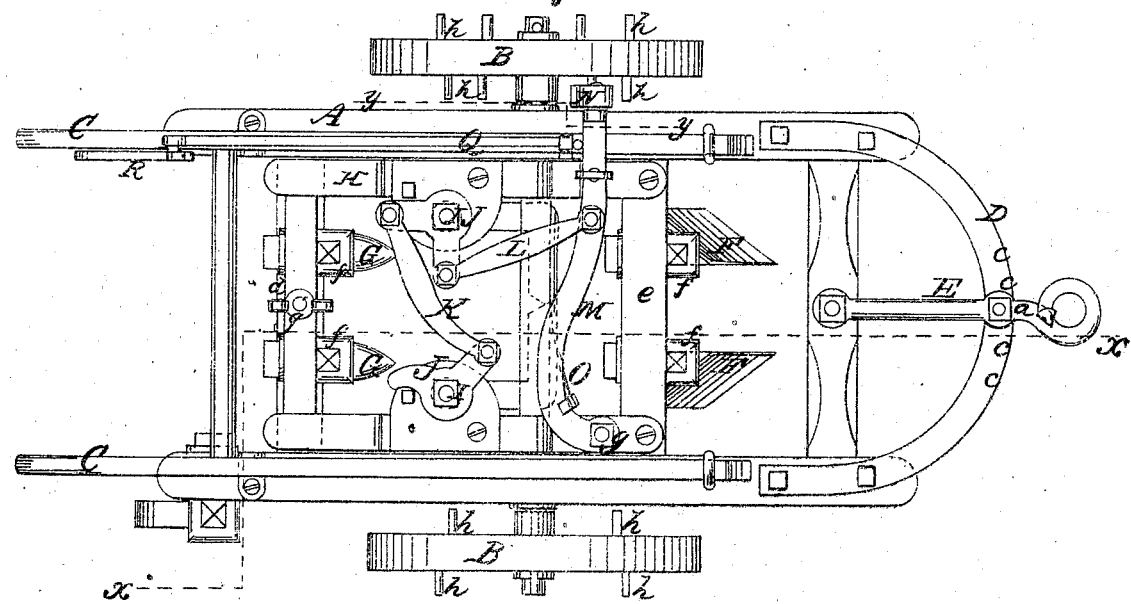
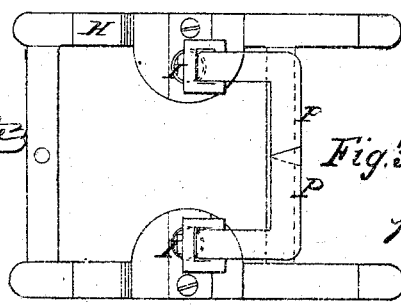
Witnesses.
W. C. Ashkettle
Theo Tasche
Inventors.
Zina Doolittle
A. M. Crowder
per Munn & Co.
Attorneys

United States Patent Office.

ZINA DOOLITTLE AND A. M. CROWDER, OF HOUSTON FACTORY, GEORGIA.

*Letters Patent No. 74,519, dated February 18, 1868.*

IMPROVEMENT IN COTTON-CULTIVATOR AND CHOPPER.

*The Schedule referred to in these Letters Patent and making part of the same.*

TO ALL WHOM IT MAY CONCERN:

Be it known that we, ZINA DOOLITTLE and A. M. CROWDER, of Houston Factory, in the county of Houston, and State of Georgia, have invented a new and improved Cotton-Cultivator and Chopper; and we do hereby declare that the following is a full, clear, and exact description thereof, which will enable others skilled in the art to make and use the same, reference being had to the accompanying drawings forming a part of this specification.

This invention relates to a new and improved device for cultivating cotton, scraping the earth from the sides of the plants, removing weeds, &c., thinning out the plants, and throwing fresh earth up to the same, all being done simultaneously, or at one operation. In the accompanying sheet of drawings—

Figure 1 is a side sectional view of our invention, taken in the line $x\ x$, fig. 2.

Figure 2, a plan or top view of the same.

Figure 3, a detached inverted plan of a removable frame pertaining to the same.

Figure 4, a section of a portion of the device, taken in the line $y\ y$, fig. 2.

Figure 5, a front view of the outer end of a lever-arm pertaining to the same.

Similar letters of reference indicate corresponding parts.

A represents a rectangular frame, which is mounted on the wheels B B, and has handles, C C, attached. To the front end of the frame A there is permanently secured a semicircular bar, D, to which the outer part of a radius draught-rod, E, is secured by a bolt, $a$, the inner end of the rod E being secured to the front cross-bar of the frame A by a bolt, $b$. The semicircular bar D is perforated with a number of holes, $c$, through any of which the bolt $a$ may pass, in order to admit of the adjustment of the rod E for one or two horses, as may be required. This will be fully understood by referring to fig. 2. The cross-bar $d$ of the frame A, as well as the one $e$, in front of it, are slotted horizontally to allow clamps, $f$, to pass through to secure scrapers F F, and shares G G, to them respectively, as shown more particularly in fig. 1. The scrapers F F are so formed as to scrape the earth away from the plants, and remove or cut off weeds, a scraper working at each side of the row of plants. The rear shares G G are made similar to cultivator-teeth, and serve to throw fresh earth towards the growing plants. On the frame A there is secured by a bolt, $g$, a supplemental frame, H, in which there are fitted two vertical arbors, I I, one at each side, said arbors being allowed to turn freely in said frame, and having each a right-angular lever, J, on their upper ends, as shown clearly in fig. 2. These levers J J are connected by a bar, K, and one of the levers J is connected by a link, L, with a lever-arm, M, one end of which is connected by a fulcrum-pin, $g$, to one side of the frame H, said arm M extending centrally across the frame, and having a swinging pendant, N, secured to its outer end, said pendant being so arranged that it may swing backward, but not forward. The lever-arm M has a spring, O, bearing against it, which spring has a tendency to keep the lever-arm pressed backward to its fullest extent. To the lowest parts of the vertical arbors I I there are attached cutters, P P, which are of right-angular form, as shown clearly in fig. 3, and they are operated, moved towards and from each other, by the motion of the lever-arm M, the latter being actuated by pins, $h$, which project horizontally from one of the wheels B, on which the machine is mounted, and by the spring O, the lever-arm causing the cutters to be forced outward from each other, and the spring O forcing them back or towards each other, the cutters, as they approach each other under this action of the spring, cutting or throwing out the plants. The pins $h$ may be at a greater or less distance apart, according to the distance required between the standing plants, and in order to avoid the inconvenience of adjusting are a series of pins, and each side of each wheel B may be supplied with them, each series being placed at different distances apart. It will be understood, of course, that either wheel may be adjusted on either arm of the axle, and either side of each wheel placed inward or towards the machine, so that its pins $h$ may work in contact with the pendant M of the lever-arm. The swinging pendant N admits of the machine being backed without any difficulty whatever, as the pins $h$ simply throw back the pendant N, which is, as previously stated, allowed to swing freely backward. To one side of the machine there is attached a slide-rod, Q, the rear end of which is connected to a lever, R. The front end of the rod Q is turned upward, and is directly behind the lever-arm M. By drawing upward the outer end of lever R, the end Q is shoved forward, and the lever-arm M moved beyond the reach of the pins $h$, so that the cutters P will remain inoperative as the machine is drawn along.

Having thus described our invention, what we claim as new, and desire to secure by Letters Patent, is—

1. The cutters P, connected to vertical arbors I, operated through the media of the levers J J, link L, lever-arm M, and pins $h$, on the wheels B, all constructed and arranged substantially as and for the purpose herein set forth.

2. The scrapers F F and shares G G, in combination with the cutters P P, all constructed and arranged to operate in the manner substantially as and for the purpose specified.

3. The adjustable draught-rod E and semicircular bar D, arranged as shown, for the purpose of adapting the machine for one or two horses.

4. The slide-rod Q and lever R, arranged and applied to the device, substantially as and for the purpose set forth.

The above specification of our invention signed by us, this 24th day of October, 1867.

ZINA DOOLITTLE,
A. M. CROWDER.

Witnesses:
    JOHN T. COOPER,
    JOHN R. PEARCE.